UNITED STATES PATENT OFFICE.

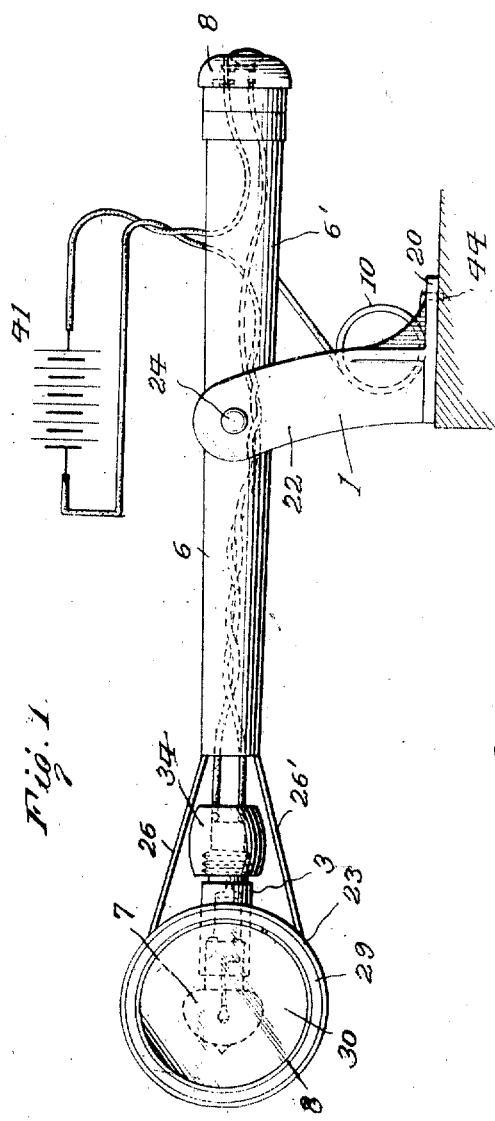
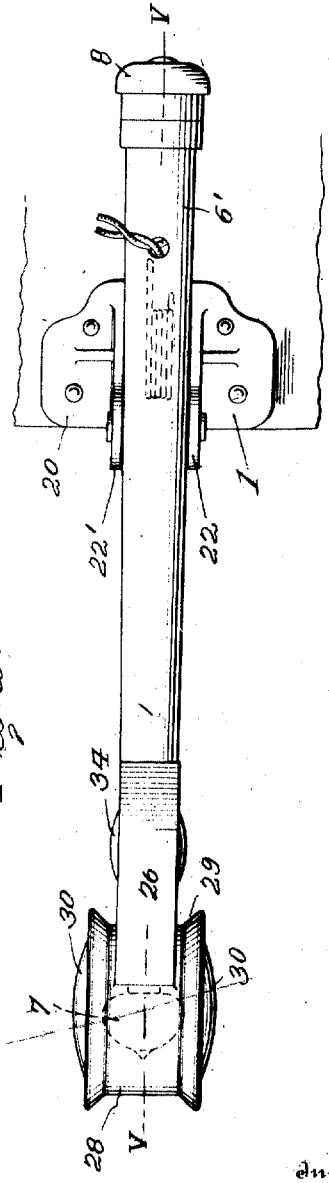

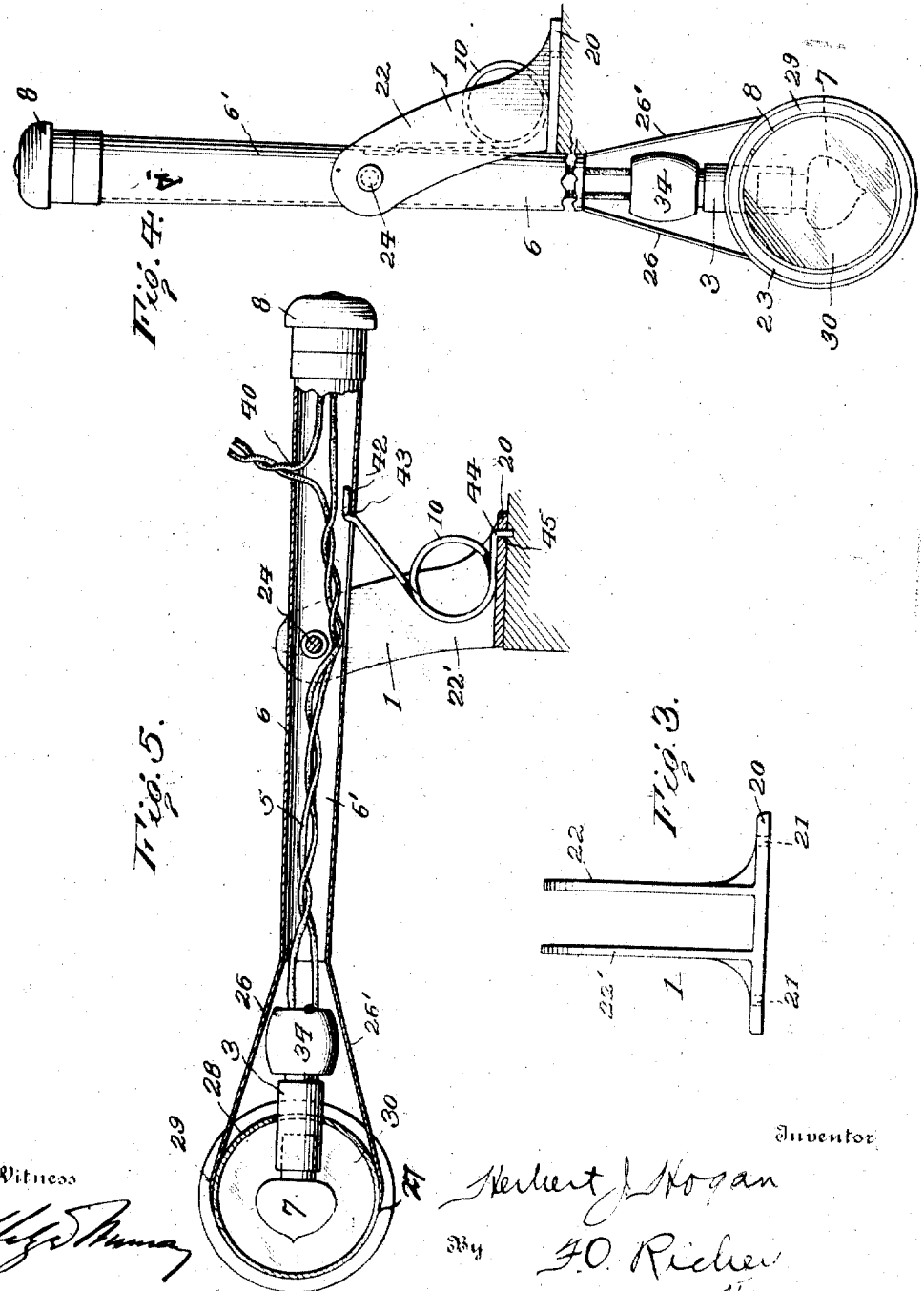

HERBERT J. HOGAN, OF FLINT, MICHIGAN.

VEHICLE-SIGNAL.

1,253,689.  Specification of Letters Patent.  Patented Jan. 15, 1918.

Application filed January 13, 1917. Serial No. 142,294.

*To all whom it may concern:*

Be it known that I, HERBERT J. HOGAN, a citizen of the United States, residing Six Hundred Ten (610) East Fifth ave., in the city of Flint, in the county of Genesee and State of Michigan, have invented new and useful Improvements in Vehicle-Signals; and I do hereby declare the following to be a full, clear, and exact description of the invention, such as will enable others skilled in the art to which it appertains to make and use the same.

My invention relates to improvements in signaling devices, more particularly adapted to be used upon vehicles such as automobiles, trucks and the like.

One of the objects of my invention is to provide suitable and convenient signaling means for warning persons, such as traffic officers, pedestrians and drivers of other vehicles of the intention of the driver employing my device to turn or stop, or to maneuver otherwise. I also aim to produce a device which can be readily detached from its mounting and used for other signaling purposes. I also aim to provide such means as can be mounted in a position where it will be very convenient to the driver, and which, when not in use, will be retired, preferably automatically, to a position where it is little liable to be injured or destroyed.

Other objects of my invention and the invention itself will probably be better understood from a description of an embodiment of my invention.

Figure 1 is a side elevation of an embodiment of my invention. Fig. 2 is a top plan view of the embodiment shown in Fig. 1. Fig. 3 is a front elevation of the supporting bracket. Fig. 4 is a side elevation showing the device in retired position. Fig. 5 is a section through the line V—V of Fig. 2.

Referring now to the drawing and to the particular embodiment of the invention shown therein, at 1 is shown a supporting bracket provided with a base 20, which is perforated in several places, as indicated at 21, and through which the apparatus is attached by means of screws or other suitable fastening means to some part of the vehicle, such as the side of an automobile body. The bracket is provided with a pair of upright members 22 and 22', each provided with a perforation near the top thereof, through which the part 6 is pivoted by means of a bolt 24, or other suitable means.

The swinging parts are shown generally at 6 and in the embodiment shown consist of a longitudinal hollow member 6', preferably shown tubular in shape, pivoted between its ends to the bracket in such a position that it will normally tend to assume the vertical position shown in Fig. 4. Means are provided on one end to support a lamp. These means here shown consist of wings 26, 26' preferably integral with the tubular member 6' and flared outwardly from their connection with said member.

The signal frame is shown at 27, and here consists of a cylindrical body portion 28 with flared edges 29, in which the lenses 30 are mounted, and retained therein by a coiled wire spring member 8 and in-turned edge 23 on the flared portions 29. The lamp is shown at 7 supported in a connecting link 3, which passes through an opening in the cylindrical body 27. The connecting link is fitted in a socket 34, to which electrical conductors 5 are connected. These conductors extend through the tubular member 6 and out an opening 40 therein. The lamp, connecting link and socket may be connected together in any suitable manner, but I prefer to use the well known bayonet slot or similar connections.

The conductors 5 lead to a circuit controller 8, here shown as a push button mounted on the opposite end of the tube 6'. I contemplate the use of any suitable form of push button, though I prefer a push button of the mushroom or umbrella type, whose overhanging edge comes over the edges of the ends of the tube. This button may be connected to the tube by any suitable means, such as screws. The conductors lead to a battery 41 for supplying current for the lamp. I have here shown a battery, though any suitable source of current may be employed.

At 10 is shown suitable means for maintaining a tension on the swinging parts of the device when in vertical position to militate against the flopping or rattling of the device when the machine is traversing rough roads, etc. In the embodiment shown a coiled spring is provided with extending ends, one of which is provided with a hook 42, which passes through an opening 43 in the tubular member 6 and the other with a hook 44 which passes through an opening 45 in the base 20 of the bracket.

When not being used, the apparatus is in the position shown in Fig. 4, where it will be out of the way of the driver and practically out of danger of being injured.

When it is desired to indicate some intended maneuver of the automobile, the driver grasps the inner end of the device and swings it to a horizontal position, or a position approaching the horizontal, at the same time operating the push button 8, which closes the circuit of the lamp signal, giving a signal to the party the driver desires to signal. Obviously, the driver may, if he so desires, by properly manipulating the push button, effect a flashing or intermittent signal. It is also obvious that under certain conditions the signals may be effected by means of the apparatus of my invention without lighting the lamp at all. This may be done under some circumstances in the day time. The wings 26 may be connected to the lamp frame in any suitable manner, such as by brazing or soldering the ends thereof to the lamp frame. A lamp of any suitable amperage or voltage may be employed at 7. I have here shown a double contact lamp, though a single contact lamp may be employed. I prefer to use red lenses though any desired kind may be employed.

I have shown this embodiment of my invention and the details employed therein for the purpose of better describing the invention, and not that I wish to be limited to such embodiment or details, as it will be apparent to those skilled in the art that many departures may be made both from the details and from the particular embodiment without departing from the spirit of the invention.

I claim:—

1. In combination, a supporting bracket adapted to be connected to the body of a vehicle, a hollow member and means to pivot the same in the bracket intermediate its ends permitting it to be swung in a vertical plane, a lamp casing supported on one end of said hollow member, wings connected at one end to the lamp casing and at the other end to the hollow member connecting said casing to said hollow member, lenses in said casing, a lamp in said casing, an interconnecting member passing through the casing connected at one end to the lamp, a lamp socket without the casing connected at the other end to the interconnecting member, a circuit controller comprising contacts all mounted on the other end of the hollow member, a suitable source of current, conductors in the hollow member connecting the lamp, the circuit controller and the source of current and a spring connected at one end to the hollow member and at the other end to the bracket.

2. In combination, a supporting bracket adapted to be mounted on a portion of the body of a vehicle, a swinging member pivoted in said bracket to swing in a vertical plane provided with an in-board and an out-board end, a signal on the out-board end of the swinging member and a signal-controlling device on the in-board end of said member.

3. In combination, a supporting bracket adapted to be connected to the body portion of a vehicle, a swinging member pivoted in said bracket, a signal on one end of said swinging member, a signal controlling device carried by and mounted on the other end of the swinging member and a spring connected to the swinging member and the bracket.

4. In combination, a supporting bracket adapted to be connected to the body of a vehicle, a swinging member pivoted in said bracket normally in a vertical position and adapted to be swung in a vertical plane to a horizontal position, means connecting said member and said bracket to militate against the shaking or rattling of the swinging member, a signal controlling device all of whose parts are mounted on and carried by said swinging member, and a signal on the out-board end of the swinging member controlled by said controlling device.

5. In combination, a supporting bracket adapted to be connected to the top of a car door, a hollow member and means to pivot said member to said bracket intermediate its ends permitting it to be retained normally in a substantially vertical position and to be swung to a horizontal position, a lamp casing supported on one end of said hollow member, a pair of wings each connected at one end to the lamp casing and at the other to the hollow member, lenses in said casing, a lamp in said casing, a lamp socket, an interconnecting member passing through the casing, to one end of which the lamp is connected and to the other end of which the lamp socket is connected, electrical terminals on said interconnecting member, conductors in said interconnecting member electrically connecting the terminals of the lamp and the terminals on said member, a circuit controller on the other end of said hollow member accessible at all times to one sitting adjacent the car door on which said member is mounted, a source of current, conductors connecting the terminals on said interconnecting member, said source and said circuit controller, and a spring connected at one end to the hollow member and at the other to the bracket and always tending to return and hold said hollow member in normal position.

January 11th, 1917.

HERBERT J. HOGAN.